US012574314B2

(12) United States Patent
Pande et al.

(10) Patent No.: US 12,574,314 B2
(45) Date of Patent: Mar. 10, 2026

(54) TIME SENSITIVE NETWORKING USING DATA CONFIDENCE FABRICS

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 18/194,621

(22) Filed: Apr. 1, 2023

(65) Prior Publication Data
US 2024/0333629 A1 Oct. 3, 2024

(51) Int. Cl.
*H04L 45/12* (2022.01)

(52) U.S. Cl.
CPC .................................... *H04L 45/12* (2013.01)

(58) Field of Classification Search
CPC ...................................................... H04L 45/12
See application file for complete search history.

(56) References Cited

U.S. PATENT DOCUMENTS

| | | | |
|---|---|---|---|
| 7,539,869 | B1 | 5/2009 | Mullan et al. |
| 8,595,484 | B2 | 11/2013 | Thomas et al. |
| 10,757,111 | B1 | 8/2020 | Marek et al. |
| 10,986,076 | B1 | 4/2021 | Bendickson et al. |
| 11,544,253 | B2 | 1/2023 | Todd |
| 2005/0044356 | A1 | 2/2005 | Srivastava et al. |

| | | | | |
|---|---|---|---|---|
| 2009/0144807 | A1 | 6/2009 | Zheng | |
| 2010/0031027 | A1 | 2/2010 | Thomas et al. | |
| 2014/0126573 | A1 | 5/2014 | Matthews et al. | |
| 2015/0007271 | A1 | 1/2015 | Wong et al. | |
| 2016/0191325 | A1 | 6/2016 | Pacella et al. | |
| 2017/0310595 | A1 | 10/2017 | Avidar et al. | |
| 2019/0036801 | A1* | 1/2019 | Natarajan | H04L 43/0888 |
| 2020/0104527 | A1 | 4/2020 | Koster et al. | |
| 2020/0233978 | A1 | 7/2020 | Sofia | |
| 2020/0382560 | A1 | 12/2020 | Woolward et al. | |
| 2021/0306256 | A1* | 9/2021 | Ward | H04L 45/04 |
| 2021/0328905 | A1* | 10/2021 | Skalecki | H04L 45/10 |
| 2022/0043721 | A1 | 2/2022 | Shemer et al. | |

(Continued)

FOREIGN PATENT DOCUMENTS

WO 2023/043598 A1 3/2023

OTHER PUBLICATIONS

Dartois et al., "Tracking Application Fingerprint in a Trustless Cloud Environment for Sabotage Detection," IEEE, 2019, 9pg. (Year: 2019).

(Continued)

*Primary Examiner* — Schquita D Goodwin
(74) *Attorney, Agent, or Firm* — Workman Nydegger

(57) ABSTRACT

Time sensitive networking with data confidence is disclosed. Data ingested into a data confidence network is associated with annotations and/or confidence scores based on trust insertion technologies applied to the data. When time sensitive networking is applied, the annotations and confidence score reflect the application or use of time sensitive networking. Applications may determine whether to use or have confidence in the data based on the confidence score and/or annotations related to the use of time sensitive networking.

20 Claims, 5 Drawing Sheets

(56) References Cited

U.S. PATENT DOCUMENTS

| | | | |
|---|---|---|---|
| 2022/0086781 A1* | 3/2022 | Kwon | H04L 69/22 |
| 2022/0100858 A1* | 3/2022 | Todd | G06F 21/57 |
| 2022/0100879 A1 | 3/2022 | Todd et al. | |
| 2022/0138325 A1* | 5/2022 | Todd | G06F 21/54 |
| | | | 726/26 |
| 2023/0004913 A1* | 1/2023 | Reineke | G06Q 10/06393 |
| 2023/0077354 A1* | 3/2023 | Moon | H04W 28/0268 |
| | | | 370/235 |
| 2023/0104424 A1* | 4/2023 | Diachina | H04W 56/0065 |
| | | | 370/350 |
| 2023/0164174 A1 | 5/2023 | Heller et al. | |
| 2023/0247040 A1 | 8/2023 | Luttwak et al. | |
| 2024/0031376 A1 | 1/2024 | Lichtenstein et al. | |
| 2024/0235984 A1* | 7/2024 | Chunduri | H04L 45/302 |
| 2024/0340235 A1 | 10/2024 | Pande et al. | |

OTHER PUBLICATIONS

Priebe et al., "CloudSafetyNet: Detecting Data Leakage between Cloud Tenants," ACM, 2014, 12pg. (Year: 2014).

Todd, Steve, "Project Alvarium: The Future of Edge Data," Dell, 2020, 39pg. (Year: 2020).

Yao et al., "A trust management framework for software-defined network applications," Wiley, 2018, 18pg. (Year: 2018).

S. J. Patil al et., CLBNSRM—Confidence Level Based Unblend Neighbor Selection & Blend Node. Report Based Optimized Route Formation in Manet, Mar. 2020, International Journal of Computer Networks & Communications (IJCNC) vol. 12, No. 2, pp. 109-129 (Year: 2020).

* cited by examiner

TIME SENSITIVE NETWORKING USING DATA CONFIDENCE FABRICS

RELATED APPLICATIONS

This application is related to U.S. Ser. No. 16/910,451, filed Jun. 24, 2020, and titled AUTOMATED DATA ROUTING IN A DATA CONFIDENCE FABRIC, which application is incorporated by reference in its entirety.

FIELD OF THE INVENTION

Embodiments of the present invention generally relate to data confidence fabric networks and data delivery in data confidence fabric networks. More particularly, at least some embodiments of the invention relate to systems, hardware, software, computer-readable media, and methods for time sensitive networking and confidence in data delivered over time sensitive networking.

BACKGROUND

Computing and other electronic devices come in a variety of types and form factors and have varying capabilities. Many of these devices generate data that may be used by various applications. There is often a question, however, about the value of the data or the confidence that an application can place in the data. In other words, applications benefit from using data in which there is high confidence. Applications that execute using data associated with high confidence levels typically generate more reliable results and outputs. Applications also benefit from data that is delivered quickly, particularly when the applications are time sensitive.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
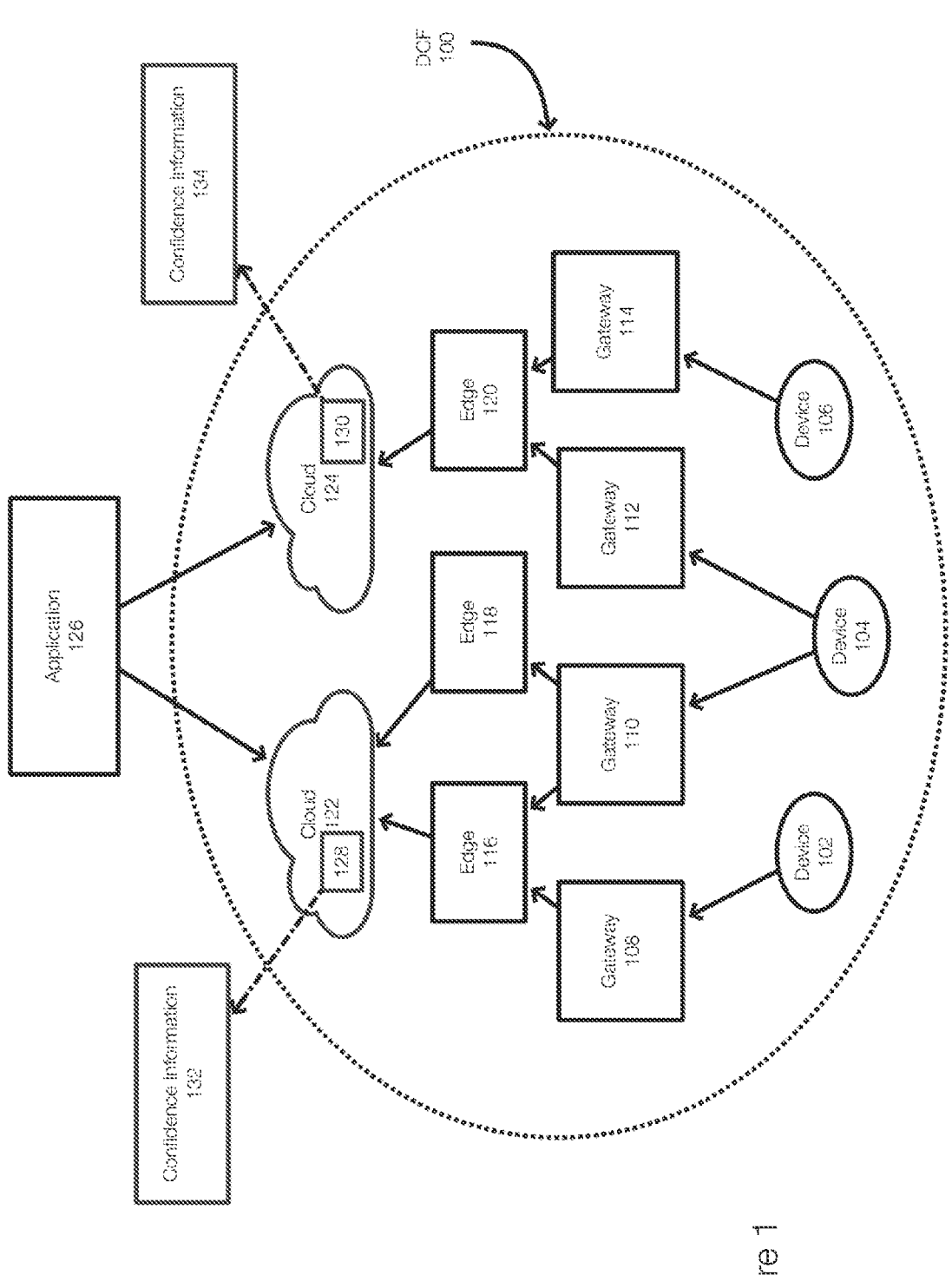
FIG. 1 discloses aspects of a computing system such as a data confidence fabric network.

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. The applications can leverage the confidence scores of the data.

A DCF is generally configured to add confidence information to data. The confidence information can take various forms including a confidence score and associated metadata. The confidence information can be added from a hardware perspective and/or a software perspective.

Embodiments of the invention relate to DCF configurations in which data or packet routing is considered. More specifically, embodiments of the invention relate to data transmitted or delivered over time sensitive networking environments. In the context of routing data, aspects of data confidence information may relate to data delivery or time required to deliver data to a destination such as an application. The ability to deliver data quickly or in a timely fashion can be reflected in the confidence information, which in turn allows an application to have more confidence in data that is delivered in a timely fashion.

Time sensitive networking is often configured to ensure that data of messages can be sent and arrive in a deterministic manner. Time sensitive networking also relates to ensuring that various requirements are satisfied. For example, time sensitive networking may ensure that, for certain data streams, requirements related to bandwidth, time synchronization, and latency are considered. In the context of a DCF, the use of time sensitive networking can improve or contribute to confidence in data being transmitted. An application, for example, may have more confidence in data delivered using time sensitive networking compared to data that is not delivered using time sensitive networking. The use of time sensitive networking can boost the confidence of an application in data because of the ability of time sensitive networking to deliver data deterministically or within relevant delivery requirements.

A DCF, by way of example only, may be an architecture and set of services that allow data to be ingested and used by applications. The DCF may include trust insertion technologies (hardware and/or software) that are applied to the data as the data flows through the DCF. Time sensitive networking can be viewed as a trust insertion technology at least because of the assurance that data is delivered in a timely manner.

Each time a trust insertion technology is applied, an annotation may be made in a ledger or other structure and the confidence score may be changed. Thus, the confidence score of data provides a view into the trustworthiness of the data to an application. Trust or confidence information can be added from both hardware and software perspectives.

A DCF may include various interconnected hardware environments (e.g., nodes). These nodes may have varying hardware capabilities that are examples of trust insertion technologies or hardware-assisted trust insertion technologies. The hardware is configured such that as data flows from data sources to storage or to applications in a DCF system, scores can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The confidence information, which may include a confidence score or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that is very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof. Applying these trust insertion technologies improves the confidence score of data.

The confidence an application has in data may be related to the manner in which the data was handled and may be related to the delivery or transit time. An application may have more confidence in data that arrives deterministically or within required parameters. For example, data may be delivered or transmitted using time sensitive networking in order to improve the likelihood that the data will arrive within relevant requirements. One benefit of time sensitive networking is that the data may have a deterministic arrival time based on the transmission time.

Time synchronized networking essentially ensures or attempts to ensure that data is delivered within a specified time. This may include the use of clocks at one or more nodes in the data path. The clocks may be GPS (Global Positioning System) based clocks. Alternatively, if GPS is not available, time synchronization may occur at the network protocol level.

Further, there are different time-measurement approaches. Audio/visual data or workloads may measure time differently from other types of sensor data. Another challenge with time sensitive networking is that the configuration and selection of fault-tolerant paths to guarantee successful delivery from a time perspective may vary. Finally, there is a need to verify that the data was delivered in a timely manner. These factors can each impact the ability of an application to have confidence in data delivered over time sensitive networks. Embodiments of the invention relate to incorporating information or data related to time sensitive networking into the confidence information and confidence score of data.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add confidence information to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies, or the like.

Data flowing through a DCF is typically more valuable and useful at least because the confidence scores or ranks of DCF annotated data allow an application to decide how to trust and/or use the associated data. Any of the paths may be configured with time sensitive networking.

Figure 2:
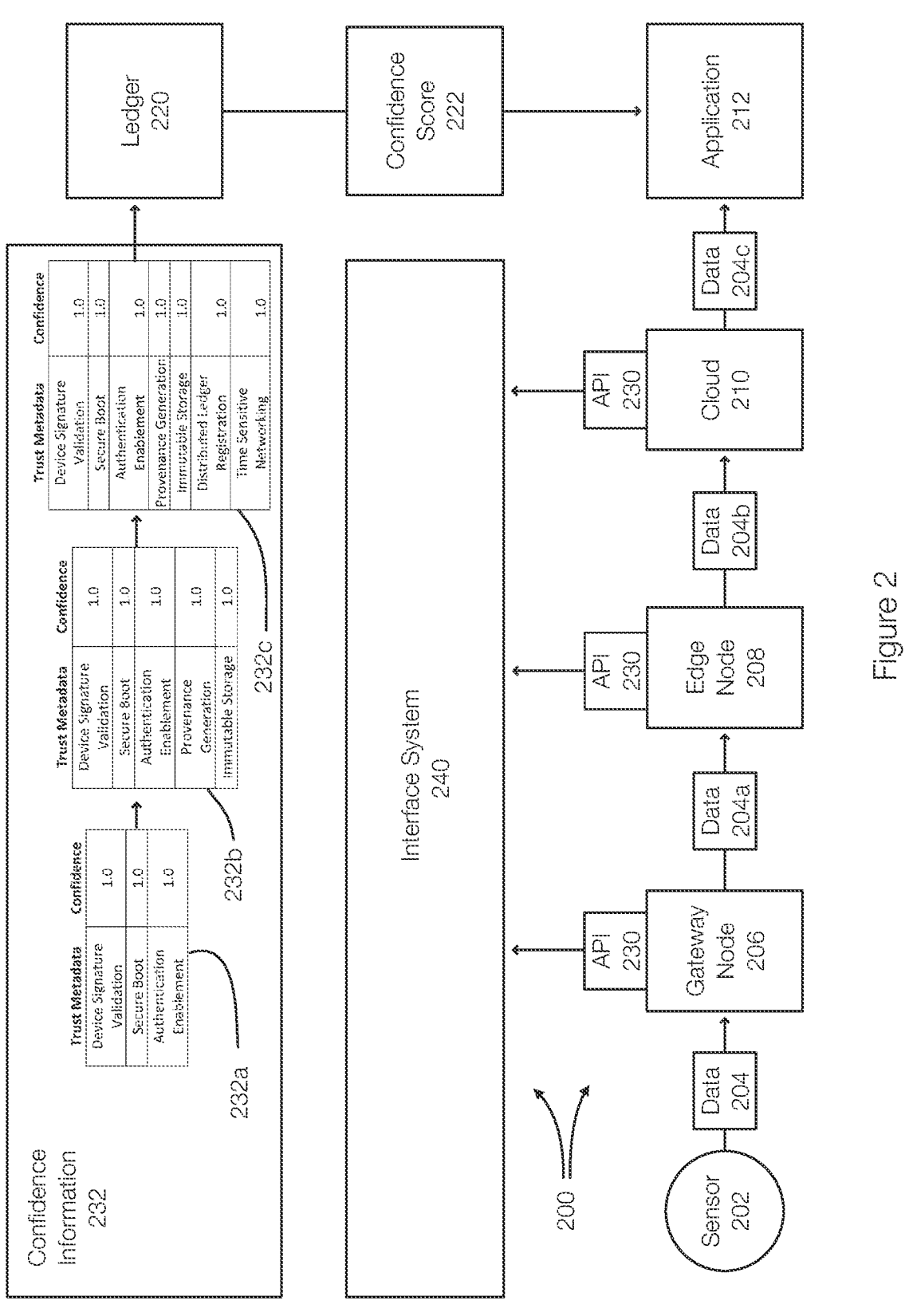
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and add a score that is reflected in the confidence information 232a. More specifically, the gateway node 206 may access an interface system 240 using an application programming interface (API) 230 to record the confidence information 232a.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the confidence information 232c and with a confidence score of, in this example, 7.0. In this example, the confidence information 232c includes confidence information related to time sensitive networking and the associated score of 1.0 may reflect that the time sensitive networking functioned as expected and timely delivered the data 204c. The application 212 thus has insight into the trustworthiness of the data 204 generated at the sensor 202.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

Embodiments of the invention relate to routing data in a DCF such as the DCF 100 or the DCF 200. However, the routing may be performed in a manner that accounts for characteristics of the route or based on time sensitive networking requirements. For example, a route for data may be based on one or more of trust capabilities (e.g., trust insertion technologies) per route in an attempt to maximize the confidence score, based on the resource availability of the nodes in the available or potential routes, delivery requirements, and on historical data (e.g., average or expected delivery times) associated with specific routes in the DCF 200. Trust capabilities, resource availability, and/or delivery times can be used or combined in different manners in order to select a route or path for the data. Thus, the data is routed in a manner that accounts for trust capabilities, speed of delivery, and/or historical outcomes.

Further, the route or path of data may employ time sensitive networking or include time sensitive portions. The confidence information thus includes confidence information (e.g., annotations) related to the time sensitive aspects of the network or data path.

Figure 3:
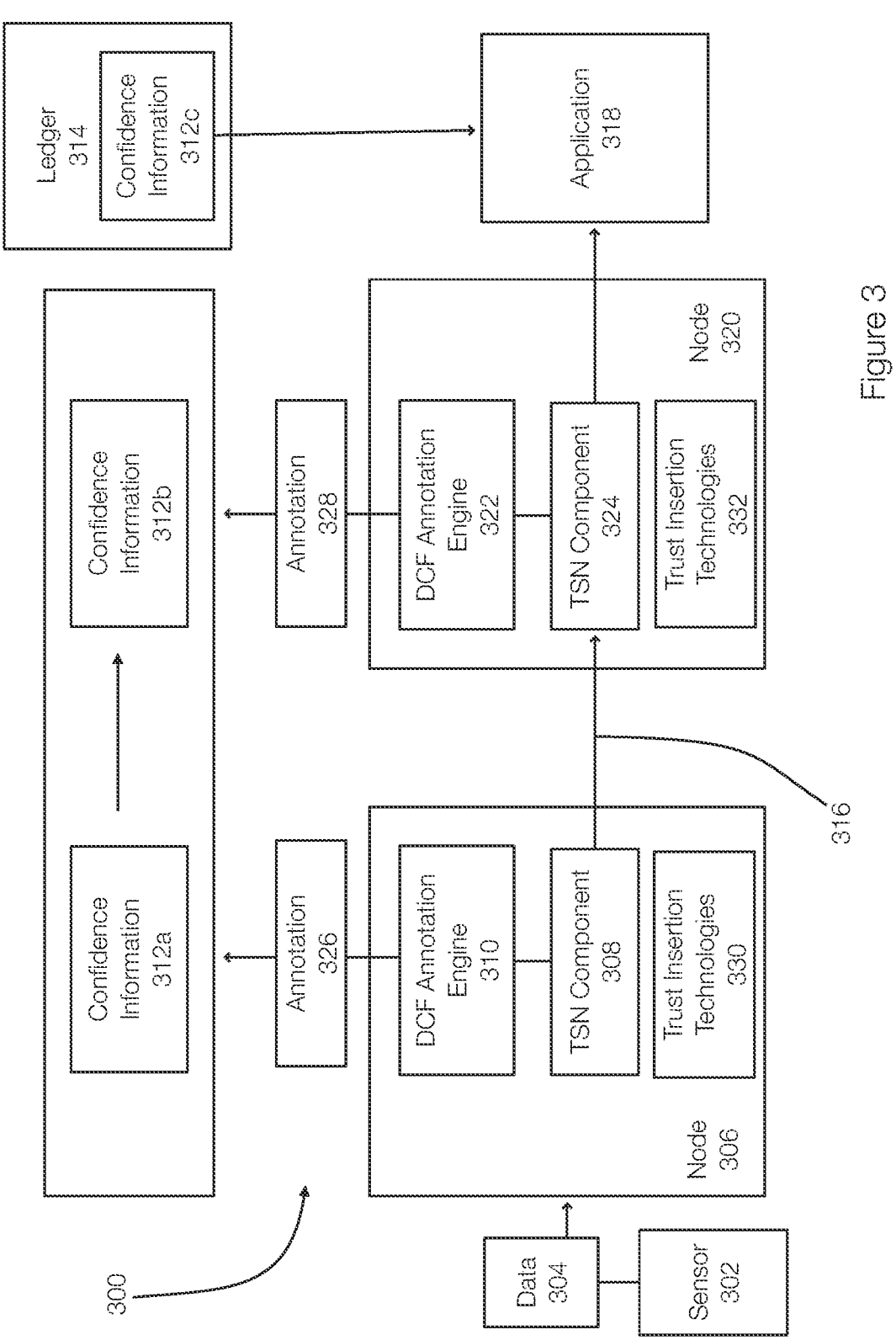
FIG. 3 discloses aspects of confidence information and confidence scores based in part on time sensitive networking.

FIG. 3 discloses aspects of confidence information and confidence scores based in part on time sensitive networking. FIG. 3 illustrates a sensor 302 that generates data 304 that may be ingested into a data confidence fabric 300. A type of the data 304 may depend on the sensor 302. Thus, the data 304 may be audio/video data, temperature data, position data, weather data, motion sensor data, temperature data, or the like.

The node 306, in this example, is an ingestion node 306 or the first node to touch or process the data 304. The node 306 may include trust insertion technologies 330. The trust insertion technologies 330 may process or operate on the data 304. Further, the TSN (time sensitive networking) component 308 may operate on the data 304 and may be viewed as an example of a trust insertion technology.

The DCF annotation engine 310 (e.g., a driver) operates to generate an annotation 326 for the data 304 that is added to confidence information 312a. In one example, the annotation 326 includes annotations related to the trust insertion technologies 330. The annotation 326 may also include an annotation such as "data delivered with TSN" using the TSN component 308.

Thus, the annotation 326 may include confidence information regarding the TSN component 308. The annotation 326 may include information about the configuration of the TSN component 308, the protocol of the TSN component 308, how clocks in the TSN are synchronized, delivery path, exact timing (e.g., timestamp), or the like. The annotation 326 is included in the confidence information 312a and may contribute to the confidence score associated with the data 304.

The data 304 is then transmitted according to the route or path to a node 320. In this example, the node 320 may represent the next hop in the route or path or an end node of the path. The path or route 316 thus represents one or more hops in a route or path of the data 304. The transmission performed by the TSN component 308 may be based on a single hop or multiple hops.

The data 304 is received at the node 320 or by the TSN component 324. Trust insertion technologies 332 of the node 320 may be applied at the node 320.

Once the data 304 is received at the node 320, the DCF annotation engine 322 may update the confidence information 312a to the confidence information 312b. The confidence information 312b may include an annotation 328 related to the TSN component 324. For example, the annotation 328 may include "received data with TSN". The confidence score may be adjusted based on performance of the TSN or other characteristics of the TSN. If the data 304 was received in a timely manner, the confidence score may be increased. Stated differently, the TSN component 324 will be given a confidence value that may be added to the overall confidence score of the data 304. If the data 304 was not received in a timely manner, the confidence score may be decreased or not added.

The data 304 may be delivered to the application 318 and the application 318 can access the confidence information 312c, which includes the confidence information associated with the data 304 as the data 304 traversed the DCF, from a ledger 314 or other storage location. The application 318 can view the overall confidence score and/or information (e.g., annotations) related to the confidence information associated specifically with the TSN.

The application 318 may require timely data or operate in a time dependent manner. If the data 304 is not delivered timely, the data 304 may not be useful or trusted by the application 318. The confidence information 312c allows the application 318 to determine how to trust the data 304. For example, the annotations and confidence score in the confidence information 312c allows the application 318 to determine whether to use, rely on, or ignore the data 304.

In addition, the confidence information 312c, which includes or reflect TSN operations and characteristics, allows the TSN operations to be audited because the confidence information in the ledger 314 allows a history or audit trail to be generated or created.

Figure 4:
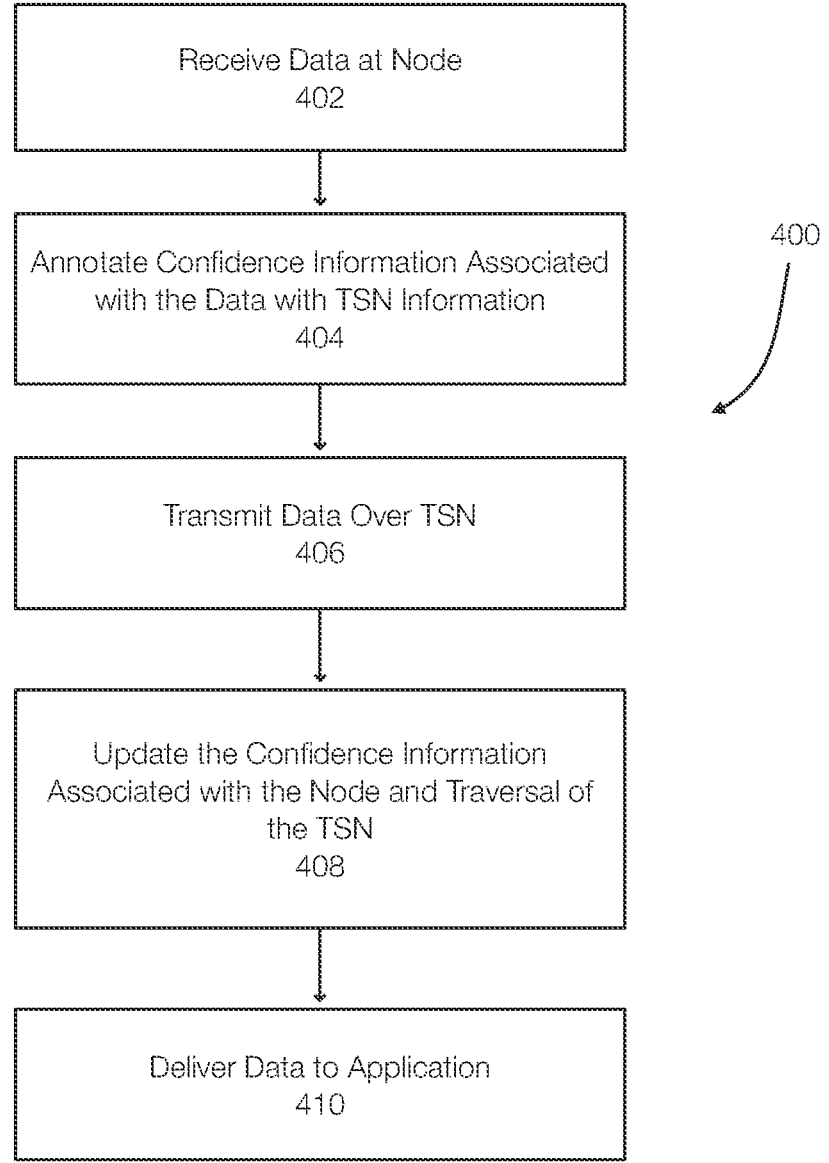
FIG. 4 discloses aspects of a method for generating data confidence information and confidence scores in the context of time sensitive networking.

FIG. 4 discloses aspects of a method of generating data confidence information and confidence scores that reflect time sensitive networking. The method 400 includes receiving 402 data from a sensor or other device (e.g., an Internet of Things device). The data is annotated 404 with confidence information related to the TSN provided at the node. The confidence information may relate to the TSN implementation, type of clock, route or path information, timestamps, and other TSN configuration data or characteristics. The confidence information may also include other annotations related to the capabilities of the node such as TSL (Transport Layer Security) or TPM (Trusted Platform Module) in the context of TSN transmission.

Once the annotation related to TSN is generated, the data is transmitted 406 in accordance with the TSN. At the next node or at a destination node, the confidence information may be updated 408 or augmented again. For example, the confidence information may be updated to reflect that the data arrived in a timely manner as guaranteed by the TSN. When transmission is successful, updating the confidence information may include increasing the data's confidence score. In addition, the annotations may include actual transmission time based on the clocks, or other information.

The data may be delivered 410 to an application that may access or use the confidence information when determining how or whether to use the data. Accessing the data by the application may include an evaluation of the confidence score and/or confidence information. Embodiments of the invention relate to measuring confidence in TSN-enabled data delivery.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data network operations, routing operations, forwarding operations, route selection operations, confidence information generation/storing operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter or other environment.

Example cloud computing environments, which may or may not be public, include storage environments that may provide services/functions for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, servers, and the like, for example, may likewise take the form of software, physical machines, containers, or virtual machines (VMs), though no particular component implementation is required for any embodiment.

As used herein, the term 'data' is intended to be broad in scope. Thus, that term embraces, by way of example and not limitation, data produced in computing environments, by far edge nodes, sensors, user devices, or the like. Data may include time series data and may have various formats and structures.

It is noted that any operation(s) of any of methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1

A method comprising: ingesting data into a data confidence fabric at a node that is configured with time sensitive networking, generating confidence information for the data at the node, wherein the confidence information includes a first annotation related to transmitting the data in the data confidence fabric using time sensitive networking, transmitting the data to a second node in the data confidence fabric, generating second confidence information at the second node, wherein the second confidence information that includes a second annotation related to receiving the data at the second node using the time sensitive networking, and storing the first confidence information and the second confidence information in a ledger, wherein the data is associated with a confidence score that accounts for the time sensitive networking.

Embodiment 2

The method of embodiment 1, wherein the first annotation generated at the node verifies that the data was sent using the time sensitive networking, wherein the first annotation identifies a clock type, a configuration of the time sensitive networking, and/or a path configuration.

Embodiment 3

The method of embodiment 1 and/or 2, wherein the first annotation identifies other trust insertion technologies of the time sensitive networking including transport layer security and/or a trusted platform module.

Embodiment 4

The method of embodiment 1, 2, and/or 3, further comprising adjusting the confidence score at the node.

Embodiment 5

The method of embodiment 1, 2, 3, and/or 4, wherein the second annotation verifies that the data was received in a timely manner provided by the time sensitive networking, wherein the confidence score is increased when the data is delivered in the timely manner and wherein the confidence score is not changed or is decreased when the data is not delivered in the timely manner.

Embodiment 6

The method of embodiment 1, 2, 3, 4, and/or 5, further comprising increasing the confidence score at the second node based on other trust insertion technologies applied at the second node.

Embodiment 7

The method of embodiment 1, 2, 3, 4, 5, and/or 6, further comprising applying other trust insertion technologies at the node and at the second node that are independent of the time sensitive networking.

Embodiment 8

The method of embodiment 1, 2, 3, 4, 5, 6, and/or 7, wherein the first annotation and the second annotation each include a timestamp.

Embodiment 9

The method of embodiment 1, 2, 3, 4, 5, 6, 7, and/or 8, wherein a path from the node to the second node comprises one hop of a path or multiple hops in the path.

Embodiment 10

The method of embodiment 1, 2, 3, 4, 5, 6, 7, 8, and/or 9, further comprising delivering the data to an application, wherein the application determines whether to use the data based on the annotation, the second annotation, and/or the confidence score of the data.

Embodiment 11

A system, comprising hardware and/or software, operable to perform any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
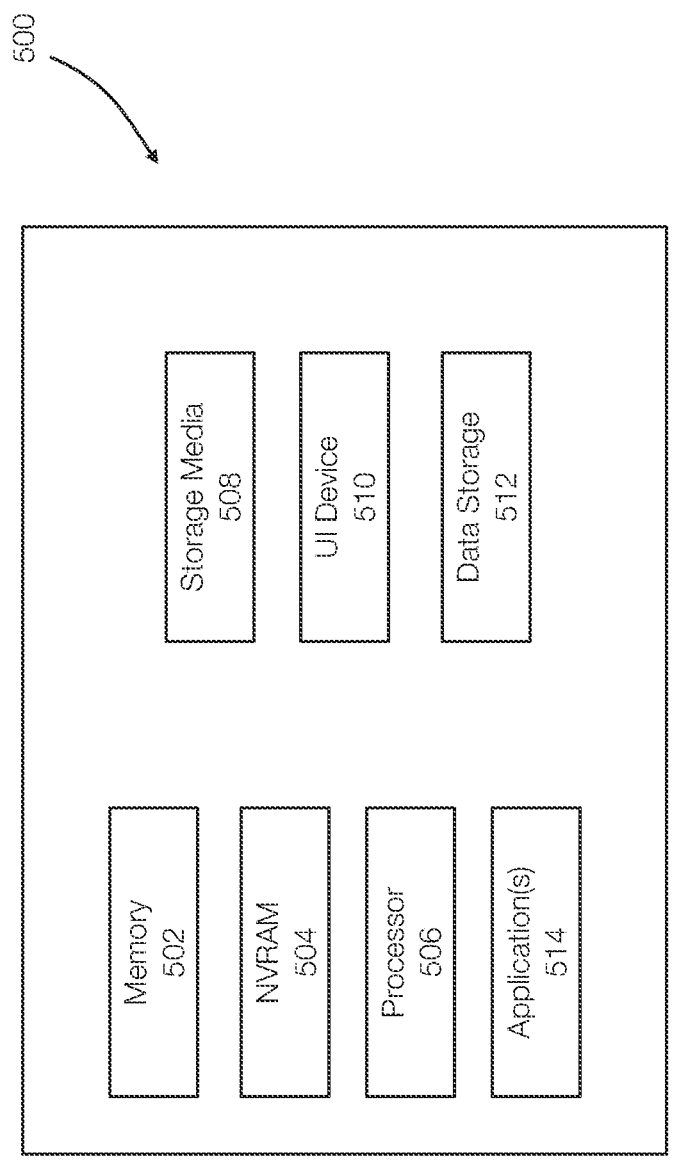
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

ingesting data into a data confidence fabric at a node that is configured with time sensitive networking;

generating confidence information for the data at the node, wherein the confidence information includes a first annotation comprising time sensitive networking parameters including clock synchronization data, a TSN configuration profile, and a delivery path definition, the first annotation being related to transmitting the data in the data confidence fabric using time sensitive networking, wherein the delivery path definition specifies a fault-tolerant path configuration that guarantees deterministic delivery;

transmitting the data to a second node in the data confidence fabric;

generating second confidence information at the second node, wherein the second confidence information includes a second annotation related to receiving the data at the second node using the time sensitive networking, wherein the second annotation confirms receipt of the data within a deterministically bounded delivery window as configured by the time sensitive networking profile at the first node, wherein the second annotation further includes a timestamp of receipt at the second node to verify compliance with the delivery window; and storing the first confidence information and the second confidence information in a ledger, wherein the data is associated with a confidence score that accounts for the time sensitive networking, wherein the confidence score is updated based on successful compliance with a delivery window and the time sensitive networking configuration, wherein storing the first and second confidence information in the ledger enables creation of a historical audit trail of time sensitive networking delivery performance including compliance with the deterministically bounded delivery window.

2. The method of claim 1, wherein the first annotation generated at the node verifies that the data was sent using the time sensitive networking, wherein the first annotation identifies a clock type, a configuration of the time sensitive networking, and/or a path configuration, including an indication of whether the node employs GPS-based or network-based synchronization.

3. The method of claim 2, wherein the first annotation identifies other trust insertion technologies of the time sensitive networking including transport layer security and/or a trusted platform module, and wherein each identified technology contributes a separate component to the confidence score.

4. The method of claim 1, further comprising adjusting the confidence score at the node based on the successful application of the configured TSN profile and the performance of associated trust insertion technologies.

5. The method of claim 1, wherein the second annotation verifies that the data was received in a timely manner provided by the time sensitive networking, wherein the confidence score is increased when the data is delivered in the timely manner and wherein the confidence score is not changed or is decreased when the data is not delivered in the timely manner, as determined by comparing receipt timestamps against delivery bounds established in the TSN configuration profile.

6. The method of claim 5, further comprising increasing the confidence score at the second node based on other trust insertion technologies applied at the second node, including provenance generation, authentication, and secure storage mechanisms.

7. The method of claim 1, further comprising applying other trust insertion technologies at the node and at the second node that are independent of the time sensitive networking, including device signature validation, immutable storage, and distributed ledger registration.

8. The method of claim 1, wherein the first annotation and the second annotation each include a timestamp derived from the respective node's TSN-synchronized clock.

9. The method of claim 1, wherein a path from the node to the second node comprises one hop of a path or multiple hops in the path, and wherein each hop may apply one or more trust insertion technologies contributing to cumulative confidence information.

10. The method of claim 1, further comprising delivering the data to an application, wherein the application determines whether to use the data based on the annotation, the second annotation, and/or the confidence score of the data, and wherein the application requires a minimum confidence threshold based on timing and trust insertion compliance.

11. A non-transitory storage medium having stored therein instructions that are executable by one or more hardware processors to perform operations comprising: ingesting data into a data confidence fabric at a node that is configured with time sensitive networking;

generating confidence information for the data at the node, wherein the confidence information includes a first annotation comprising time sensitive networking parameters including clock synchronization data, a TSN configuration profile, and a delivery path definition, the first annotation being related to transmitting the data in the data confidence fabric using time sensitive networking, wherein the delivery path definition specifies a fault-tolerant path configuration that guarantees deterministic delivery;

transmitting the data to a second node in the data confidence fabric;

generating second confidence information at the second node, wherein the second confidence information includes a second annotation related to receiving the data at the second node using the time sensitive networking, wherein the second annotation confirms receipt of the data within a deterministically bounded delivery window as configured by the time sensitive networking profile at the first node, wherein the second annotation further includes a timestamp of receipt at the second node to verify compliance with the delivery window; and storing the first confidence information and the second confidence information in a ledger, wherein the data is associated with a confidence score that accounts for the time sensitive networking, wherein the confidence score is updated based on successful compliance with a delivery window and the time sensitive networking configuration, wherein storing the first and second confidence information in the ledger enables creation of a historical audit trail of time sensitive networking delivery performance including compliance with the deterministically bounded delivery window.

12. The non-transitory storage medium of claim 11, wherein the first annotation generated at the node verifies that the data was sent using the time sensitive networking, wherein the first annotation identifies a clock type, a configuration of the time sensitive networking, and/or a path configuration, including an indication of whether the node employs GPS-based or network-based synchronization.

13. The non-transitory storage medium of claim 12, wherein the first annotation identifies other trust insertion technologies of the time sensitive networking including transport layer security and/or a trusted platform module, and wherein each identified technology contributes a separate component to the confidence score.

14. The non-transitory storage medium of claim 11, further comprising adjusting the confidence score at the node based on the successful application of the configured TSN profile and the performance of associated trust insertion technologies.

15. The non-transitory storage medium of claim 11, wherein the second annotation verifies that the data was received in a timely manner provided by the time sensitive networking, wherein the confidence score is increased when the data is delivered in the timely manner and wherein the confidence score is not changed or is decreased when the data is not delivered in the timely manner, as determined by comparing receipt timestamps against delivery bounds established in the TSN configuration profile.

16. The non-transitory storage medium of claim 15, further comprising increasing the confidence score at the second node based on other trust insertion technologies applied at the second node, including provenance generation, authentication, and secure storage mechanisms.

17. The non-transitory storage medium of claim 11, further comprising applying other trust insertion technologies at the node and at the second node that are independent of the time sensitive networking, including device signature validation, immutable storage, and distributed ledger registration.

18. The non-transitory storage medium of claim 11, wherein the first annotation and the second annotation each include a timestamp derived from the respective node's TSN-synchronized clock.

19. The non-transitory storage medium of claim 11, wherein a path from the node to the second node comprises one hop of a path or multiple hops in the path, and wherein each hop may apply one or more trust insertion technologies contributing to cumulative confidence information.

20. The non-transitory storage medium of claim 11, further comprising delivering the data to an application, wherein the application determines whether to use the data based on the annotation, the second annotation, and/or the confidence score of the data, and wherein the application requires a minimum confidence threshold based on timing and trust insertion compliance.

* * * * *